(12) United States Patent
Stabler (10) Patent No.: US 12,173,840 B2
(45) Date of Patent: Dec. 24, 2024

(54) LEG RETENTION CLIP

(71) Applicant: Joshua Stabler, Merriam, KS (US)

(72) Inventor: Joshua Stabler, Fairway, KS (US)

( * ) Notice: Subject to any disclaimer, the term of this patent is extended or adjusted under 35 U.S.C. 154(b) by 0 days.

(21) Appl. No.: 17/952,600

(22) Filed: Sep. 26, 2022

(65) Prior Publication Data
US 2023/0016102 A1  Jan. 19, 2023

Related U.S. Application Data

(63) Continuation of application No. 17/308,125, filed on May 5, 2021, now Pat. No. 11,493,168.

(51) Int. Cl.
*F16M 11/32* (2006.01)
*F16B 7/10* (2006.01)

(52) U.S. Cl.
CPC ............. *F16M 11/32* (2013.01); *F16B 7/105* (2013.01)

(58) Field of Classification Search
CPC ................................ F16M 11/32; F16B 7/105
See application file for complete search history.

(56) References Cited

U.S. PATENT DOCUMENTS

| | | | |
|---|---|---|---|
| 4,247,216 A | 1/1981 | Pansini | |
| 6,371,686 B1 | 4/2002 | Wu | |
| 7,896,398 B2 | 3/2011 | Suda et al. | |
| 8,491,215 B2 | 7/2013 | Young | |
| 9,080,585 B2 * | 7/2015 | Lai | F16B 7/042 |
| 9,323,134 B2 | 4/2016 | Clark | |
| 11,123,857 B1 | 9/2021 | Ramsey | |
| 11,493,168 B1 * | 11/2022 | Stabler | F16B 7/042 |
| 2003/0007830 A1 * | 1/2003 | Bang | B25G 3/18 403/327 |
| 2016/0238049 A1 * | 8/2016 | Bruneel | B25J 1/04 |
| 2018/0015606 A1 * | 1/2018 | Kurani | F16B 7/0406 |

OTHER PUBLICATIONS

892 Form dated Apr. 14, 2022 which was issued in connection with U.S. Appl. No. 17/308,125.
Notice of Allowance dated Jun. 29, 2022 which was issued in connection with U.S. Appl. No. 17/308,125.

\* cited by examiner

*Primary Examiner* — Anita M King (57) ABSTRACT

Provided is a leg retention clip for a leg of a tripod and a tripod assembly that includes the leg retention clip. The leg retention clip can be inserted inside a hollow-out inside of a first leg section with slots/holes which output protruding edges of the leg retention clip. When a second leg section is fitted over the first leg section, the protruding edges of the leg retention clip can stop movement of the second leg section and help lock the second leg section in place with respect to the first leg section. If the leg of the tripod includes more than two leg sections, the leg can be provided with multiple leg retention clips.

18 Claims, 7 Drawing Sheets

LEG RETENTION CLIP

CROSS-REFERENCE TO RELATED APPLICATION(S)

The present invention is a continuation of non-provisional U.S. patent application Ser. No. 17/308,125 which was filed on May 5, 2021, incorporated by reference herein in its entirety.

BACKGROUND

The present application is a continuation of U.S. patent application Ser. No. 17/308,125, filed on May 5, 2021, in the United States Patent and Trademark Office, the entire disclosure of which is incorporated herein for all purposes.

A tripod is often used to stabilize and elevate an object such as a camera, a scope, a rifle, and the like. In some cases, the legs of the tripod may be retractable. Here, the legs may include a plurality of tubular sections with different diameters. For example, an upper tubular section at the top of the leg may have the largest diameter enabling the upper tubular section to slide over and hide the lower tubular sections of the leg. When in use, the lower tubular sections may be pulled out to a desired length and locked using leg locks. When finished, the lower tubular sections may be collapsed into the upper tubular section allowing the tripod to be compactly stored.

Shims are commonly used on the exterior of the tubular sections of the leg to prevent the leg sections from becoming completely detached from one another. For example, one or more shims may be attached around an exterior of a lowest tubular leg section to stop the lower leg section at its longest point of extension. However, plastic shims are not durable. In cold temperatures, a plastic shim can become brittle and break. Furthermore, plastic shims are attached to an outer surface of the lower tubular section. This requires the next/upper tubular section to loosely fit around the lower tubular section to make room for the shims. Because of the loose fit, the tripod can wiggle when in use.

SUMMARY

According to an aspect of an example embodiment, provided is a tripod assembly that may include a leg that comprises multiple hollow tube sections including a second hollow tube section that slides over a first hollow tube section, where the first hollow tube section comprises a first plurality of openings and the second hollow tube sections comprises a second plurality of openings. The tripod assembly may include a leg retention clip that fits inside the first hollow tube section and comprises a plurality of prongs, where each prong includes a protruding edge configured to fit through a respective first opening of the first hollow tube section and a respective second opening of the second hollow tube sections. The leg retention clip may further include a first stop face configured to prevent movement of the leg retention clip within the first hollow tube section and a second stop configured to prevent movement of the second hollow tube section with respect to the first hollow tube section.

According to an aspect of another example embodiment, provided is a leg retention clip that may include a plurality of prongs that are interconnected to one another at a point of connection. Each prong may include a protruding edge configured to fit through a respective first opening of a first hollow tube section and a respective second opening of the second hollow tube sections, a first stop face configured to prevent movement of the leg retention clip within the first hollow tube section, and a second stop configured to prevent movement of the second hollow tube section with respect to the first hollow tube section.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a leg retention clip that can be used to stop movement of a leg section of a tripod leg. Rather than fit over the leg section, the leg retention clip is configured to be compressed and inserted inside the tubular leg section. The leg retention clip may include multiple prongs (e.g., 2, 3, 4, 5, etc.) which are connected to each other at one end, and when branch out in a radial fashion on the other end. The prongs may be made of a material (e.g., steel) and a thickness that allows the prongs to compress when pressure is applied and decompress when the pressure is removed. Each prong may include a protruding edge that is configured to lock into an opening of the tubular leg section and also a corresponding opening of a larger tubular leg section that is slid over the tubular leg section. Each prong may also include two stop faces including a first stop face configured to stop movement of the tubular leg section in which the leg retention is installed and an upper tubular leg section that slides over the tubular leg section in which the leg retention clip is installed.

Some of the benefits of the leg retention clip described herein include toolless tube assembly, reducing labor cost for a manufacturer of the tripod legs, and allowing maintenance, cleaning, and/or repair to be much easier.

In some embodiments, the protruding edges of the prongs may have a ramp shape. When an interior of the larger tubular leg section contacts the protruding edges of the prongs, the pressure from the interior of the larger tubular leg section on the ramp-shaped protruding edge causes the prongs to compress enough to prevent the second stop face from contacting the larger tubular leg section. Thus, the larger tubular leg section is able to slide, twist, move, etc. over the tubular leg section in which the leg retention clip is installed. The prong may remain compressed until openings within the larger tubular leg section are positioned over the ramp-shaped protruding edges of the leg retention clip. When the openings of the larger tubular leg section are positioned over the protruding edges of the prongs, the prongs may decompress causing the second stop face to protrude through the openings and prevent/stop the movement of the tubular leg section in which the leg retention is installed with respect to the larger tubular leg section.

The leg retention clip has a number of advantages over a traditional shim. For example, the leg retention clips can be made of metal (e.g., steel) which is not susceptible to cold or warm temperatures. Moreover, the leg retention clip can use compression and can be installed internally within the tubular leg section. Thus, the upper tubular leg section that fits over the tubular leg section where the leg retention clip is installed can have a tighter fit (i.e., less tolerant, etc.) because there is no need to make room for shims. The tighter fit makes it easier to lock the larger tubular leg section to the tubular leg section using a leg lock because the leg lock does not need to create as much pressure on the larger tubular section. Furthermore, the tighter fit increases the rigidness and strength of the telescoping tube assembly.

Figure 1A:
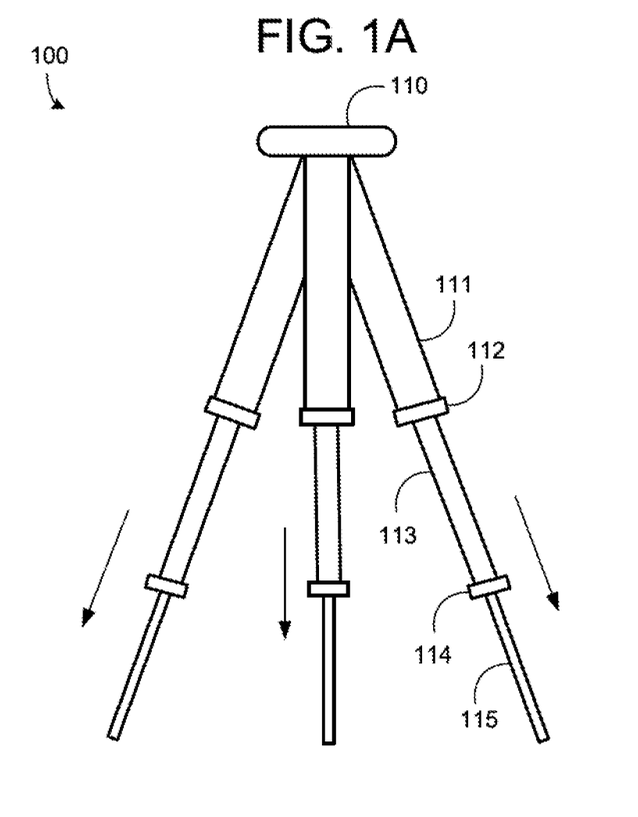
FIG. 1A is a diagram illustrating a tripod system after a plurality of tripod legs have been extended in accordance with an example embodiment.

FIG. 1A illustrates a tripod apparatus 100 after a plurality of tripod legs have been extended in accordance with an example embodiment. The tripod apparatus 100 may include three legs, and may include a support 110 for holding and elevating a piece of equipment such as a camera, a scope, a rifle, or the like. Each of the legs may be collapsible or otherwise retractable. In this example, each leg includes three tubular leg sections 111, 113, and 115. However, it should be appreciated, that the number of tubular leg sections may be different than three, for example, two, four, or more. Each tubular leg section has an exterior surface diameter than is smaller than an interior surface diameter of the tubular leg sections above it. In this example, the tubular leg section 115 has the smallest diameter. Here, an interior surface of the tubular leg section 113 has a larger diameter than an exterior surface of the tubular leg section 115, and an interior surface of the tubular leg section 111 has a diameter that is larger than an exterior surface of the tubular leg section 113.

In operation, the leg sections 113 and 115 may be pulled out from the leg section 111. Furthermore, leg retention clips (e.g., shown in FIGS. 2A, 2B, 4, etc.) may be installed within the tubular leg section 113 and the tubular section 115, which holds the leg sections 113 and 115 at the largest points of extension. Furthermore, leg locks 112 and 114 may be place around the tubular leg sections and used to lock the leg sections to each other. For example, leg lock 112 may fit around the outside exterior surface of the tubular leg section 111 and may be used to lock tubular leg section 113 within the tubular leg section 111, when compressed by a user (e.g., via turning, screws, etc.). Likewise, leg lock 114 may fit around the outside exterior surface of the tubular leg section 113 and may be used to lock tubular leg section 115 within the tubular leg section 113, when compressed by a user.

Figure 1B:
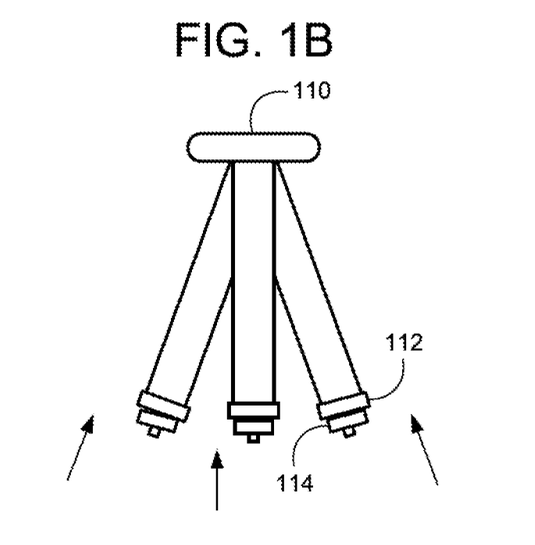
FIG. 1B is a diagram illustrating the tripod system of FIG. 1A after the legs have been collapsed in accordance with an example embodiment.

FIG. 1B is a diagram illustrating the tripod apparatus 100 of FIG. 1A after the legs have been collapsed in accordance with an example embodiment. Referring to FIG. 1B, the leg locks 112 and 114 can be loosened enabling the tubular leg sections 113 and 115 to slide upwards and enveloped by an interior of the tubular leg section 111 thereby hiding the tubular leg sections 113 and 115. By collapsing the leg sections, the tripod apparatus 100 becomes more compact and easier to store.

Figure 2A:
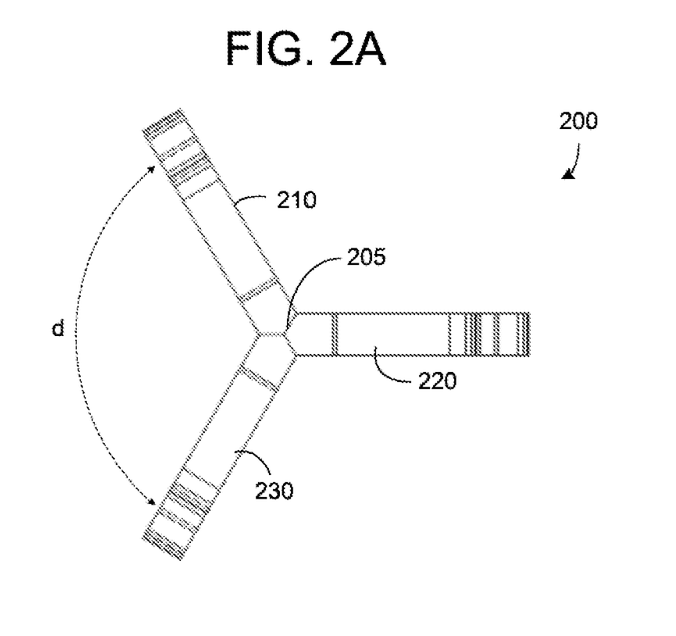
FIG. 2A is a diagram illustrating a view from above a leg retention clip in accordance with an example embodiment.
Figure 2B:
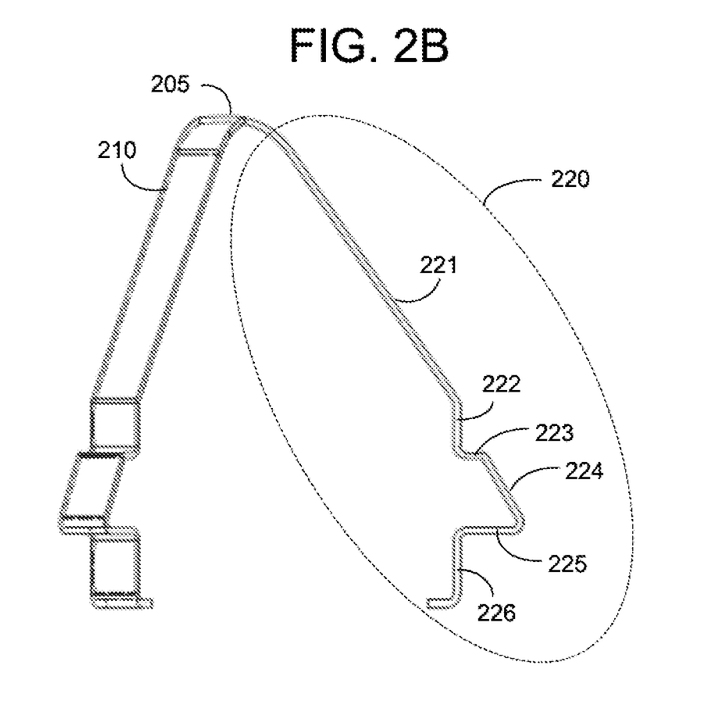
FIG. 2B is a diagram illustrating a side view of the leg retention clip of FIG. 2A, in accordance with an example embodiment.

FIG. 2A illustrates a view from above a leg retention clip 200 in accordance with an example embodiment, and FIG. 2B illustrates a side view of the leg retention clip 200 of FIG. 2A, in accordance with an example embodiment. Referring to FIG. 2A, the leg retention clip 200 includes three prongs 210, 220, and 230, which are interconnected at a central arch 205 of the leg retention clip 200. In some embodiments, the leg retention clip 200 including the multiple prongs 210, 220, and 230, may be of uniform construction. The leg retention clip 200 may be made of a metal such as steel, or the like. Also, although three prongs 210, 220, and 230 are shown branching out from a central arch 205 of the leg retention clip 200, it should be appreciated that the leg retention clip 200 may include a different number of prongs, for example, two prongs, four prongs, five prongs, or the like.

In the example of FIG. 2A, the three prongs 210, 220, and 230 branch outward and downward from the central arch 205. Furthermore, the three prongs 210, 220, and 230 are equally spaced apart from each other by a distance (d). Furthermore, the prongs 210, 220, and 230 may be arranged via approximately identical angles with respect to each other. As a non-limiting example, the prong 210 and the prong 230 may be arranged at approximately 120° with respect to each other when viewed from above. Likewise, the prongs 210 and 220 may be arranged at approximately 120° with respect to each other when viewed from above, and the prongs 220 and 230 may be arranged at approximately 120° with respect to each other when viewed from above.

FIG. 2B illustrates a cutaway side view of the second prong 220 of the leg retention clip 200 shown in FIG. 2A. In this example, the cutaway occurs in the second prong 220 enabling the boundary lines of the various features of the second prong 220 to be visible. It should be appreciated that each of the prongs 210 and 230 may have the same features as the second prong 220, including an arm 221, a first contact face 222, a first stop face 223, a protruding edge 224, a second stop face 225, and a second contact face 226. Furthermore, the first prong 210 and the second prong 220 are connected to each other at the central arch 205 located in the middle of the leg retention clip 200 and above the protruding edge 224. In this example, the first stop face 223 and the second stop face 225 run parallel to each other and provide stop faces for two different hollow tubular sections. In particular, the first stop face 223 holds the leg retention clip 200 in place within an inner hollow tubular leg section and the second stop face 225 stops the inner hollow tubular leg section from moving outward with respect to an outer hollow tubular section. A size of the first stop face 223 may be different (e.g., smaller) than a size of the second stop face 225.

Figure 2C:
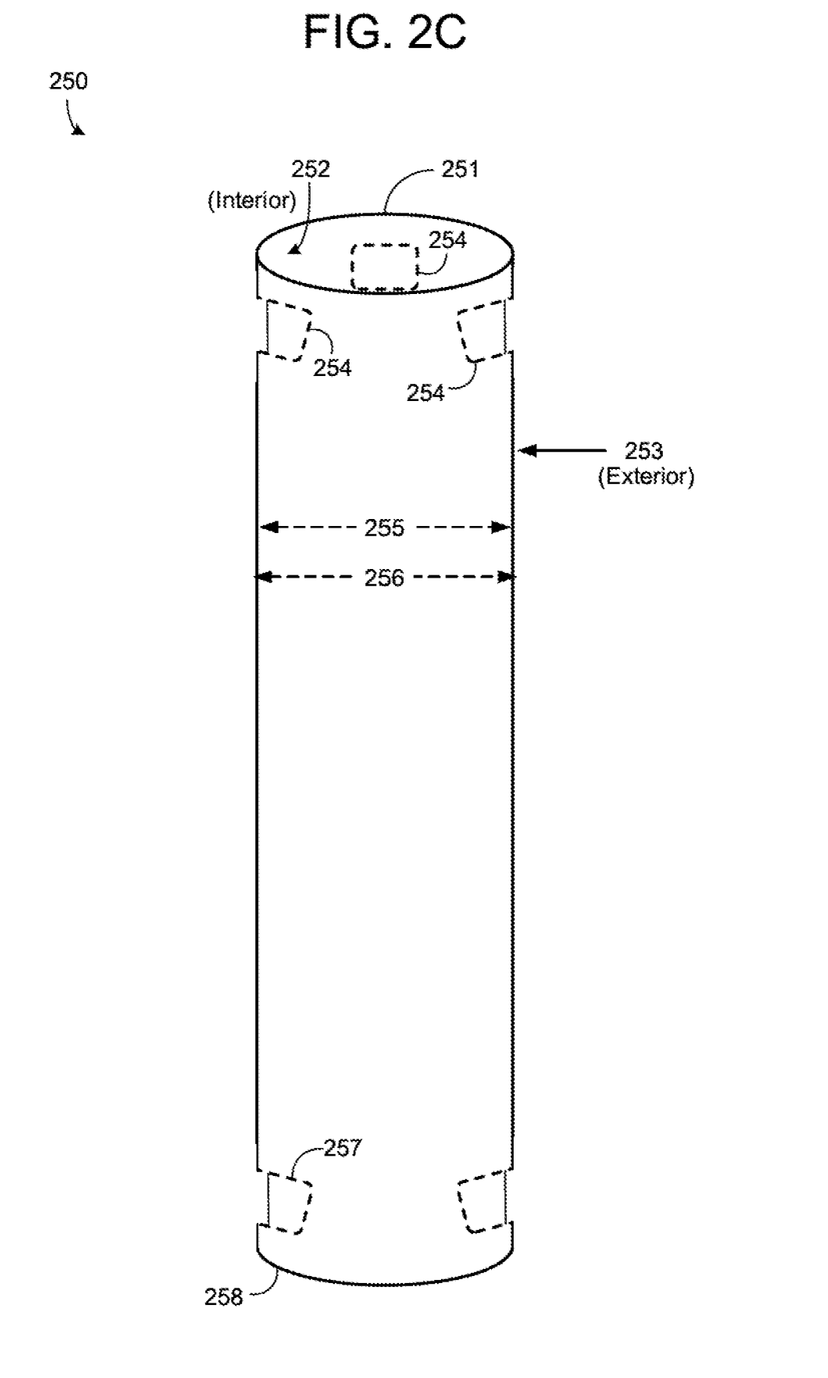
FIG. 2C is a diagram illustrating a tubular leg section of a tripod in accordance with an example embodiment.

FIG. 2C is a diagram illustrating an example of a tubular leg section 250 that may be included within a leg of a tripod or other stand/assembly. For example, the tubular leg section 250 may be any of the leg sections 111, 113, and 115 shown in FIG. 1A.

Referring to FIG. 2C, the tubular leg section 250 may include an interior surface 252 inside the hollowed out interior of the tubular leg section 250 which runs from a top 251 to a bottom 258 of the tubular leg section 250. The interior surface 252 may have a diameter 255. Furthermore, the tubular leg section 250 may have an exterior surface 253 with a diameter 256 that is slightly larger than the diameter 255 of the interior surface 252 and distanced from the interior surface 252 by a width of a tube wall. Here, the tube wall may have any desired thickness, for example, 0.5 mm, 1.0 mm, 1.5 mm, 2.0 mm, and the like. In some embodiments, the tubular leg section 250 may have rounded openings (hollow) at the top 251 and the bottom 258 thereof, which are capable of receiving or being received by other tubular leg sections.

In the example of FIG. 2C, the tubular leg section 250 includes a first set of openings 254 that are arranged around the outside of the tubular leg section 250 on a common plane. Here, each opening 254 may be the same distance away from the top 251 of the tubular leg section 250. Each of the openings 254 is configured to receive a protruding edge of a different prong of the leg retention clip 200. The tubular leg section 250 also includes a second set of openings 257 which are arranged around the outside of the tubular leg section 250 on a common plane with each other. Each of the openings 257 may be the same distance away from the bottom 258 of the tubular leg section 250 and may also be configured to receive different protruding edges of another leg retention clip 200.

Referring now to FIGS. 2B and 2C, each of the first contact face 222 and the second contact face 225 of the prong 220 of the leg retention clip 200 are configured to contact the interior surface 252 of the hollow tubular leg section 250 when the leg retention clip 200 is installed within an interior (hollow tube) of the hollow tubular leg section 250. Meanwhile, the protruding edge 224 is configured to protrude through an opening (e.g., one of the openings in the first set of openings 254 or the second set of openings 257). For example, the protruding edge 224 may protrude through one of the opening 254 from among the first set of openings 254. In this example, the first contact face 222 may contact the interior surface 252 of the hollow tubular leg section 250 at a point above the opening 254, and the second contact face 226 may contact the interior surface 252 at a point below the opening 254.

Figure 2D:
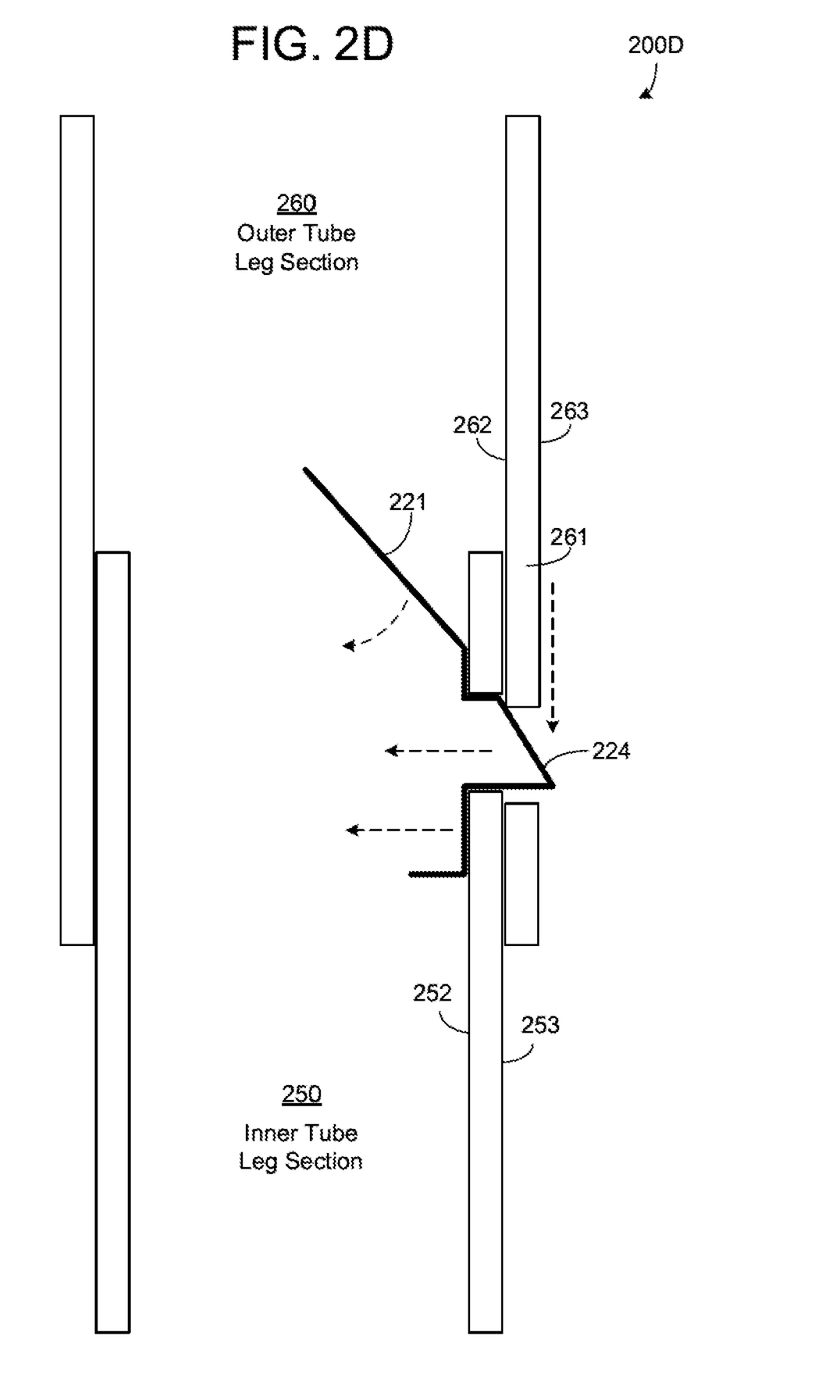
FIG. 2D is a diagram illustrating a process of compressing the leg retention clip in accordance with an example embodiment.

FIG. 2D is a diagram illustrating a process 200D of compressing a prong of the leg retention clip 200. The tubular leg section 250 may have a leg retention clip 200 (shown in FIGS. 2A and 2B) installed therein. Referring to FIG. 2D, the prong arm 221 may compress when a force is applied from above the ramp-shaped protruding edge 224. Here, the force from above may be provided by a tube wall 261 of another hollow tubular leg section 260 that is sliding over the hollow tubular leg section 250. Here, the hollow tubular leg section 260 includes an inner surface 262 and an outer surface 263. The hollow tubular leg section 250 may slide into an opening at the bottom of the hollow tubular leg section 260 and an inner surface 262 may slide along the outer surface 253 of the hollow tubular leg section 250.

In this example, the hollow tubular leg section 260 is an outer tube with respect to the tubular leg section 250 which is an inner tube. Here, the tube wall 261 may push on the ramp-shaped protruding edge 224 causing the protruding edge 224 to move leftwards towards an interior of the tubular leg section 250 where the leg retention clip is installed. Due to the ramp shape of the protruding edge 224, as the tube wall 261 is brought downward the prong arm 221 will continue to compress until the stop face 225 is no longer outside of the opening of the hollow tubular leg section 250 thereby allowing an interior surface 262 of the hollow tubular leg section 260 to slide freely/unrestrained up and down, twisted, and the like, with respect to the outer surface 253 of the hollow tubular leg section 250. When the force is released, the protruding edge 224 may spring back to its uncompressed state (i.e., move rightwards to its original position).

Furthermore, as noted herein, the leg retention clip 200 is multi-pronged. In this way, when the protruding edges are compressed (e.g., by an outer hollow tubular leg section being slid over the tubular leg section 250) the protruding edges of the different prongs are simultaneously pressed on causing all of the prongs to compress inwards at the same time. Furthermore, when the force is removed, the prongs may simultaneously decompress and push back into their original place.

Figure 3A:
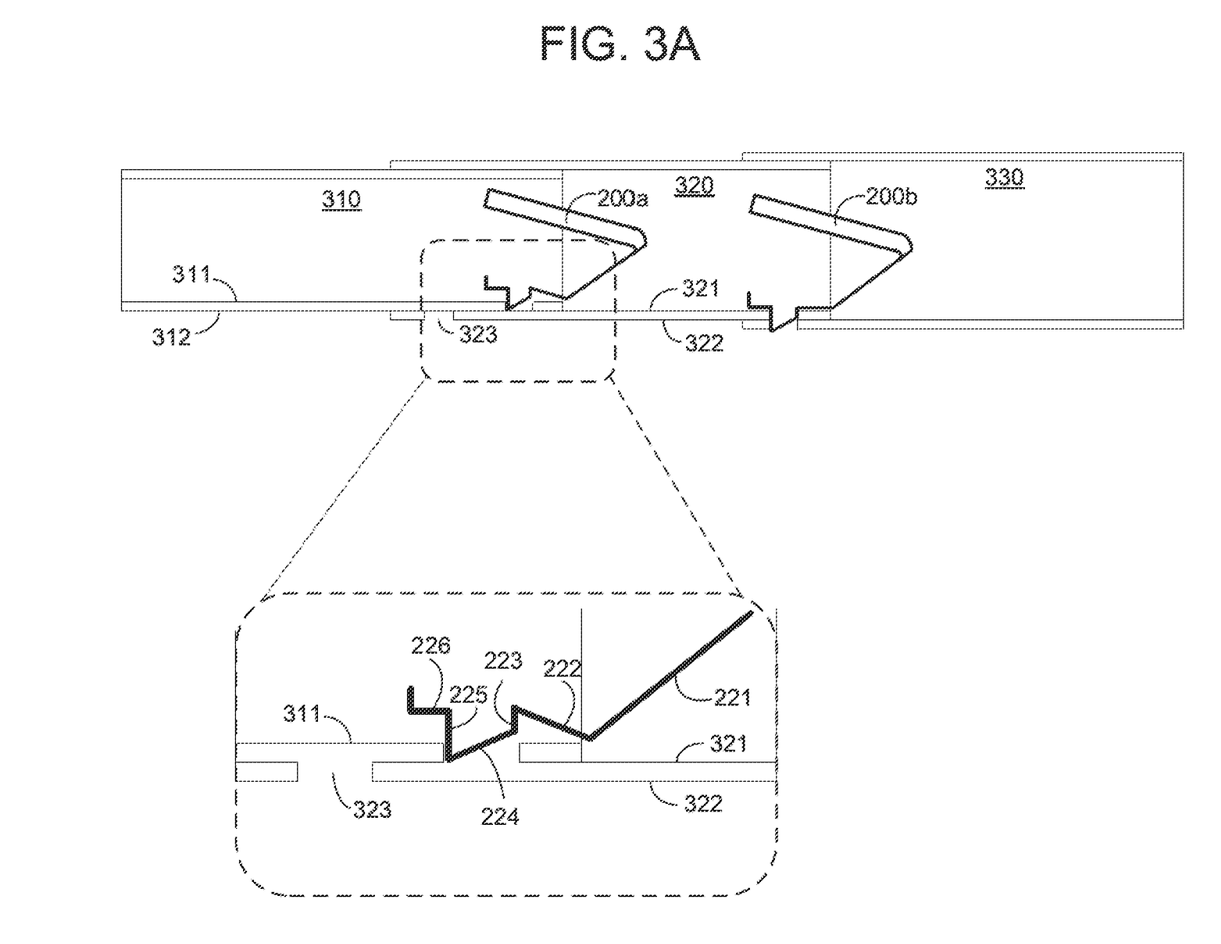
FIG. 3A is a diagram illustrating a leg retention clip in a compressed state in accordance with an example embodiment.
Figure 3B:
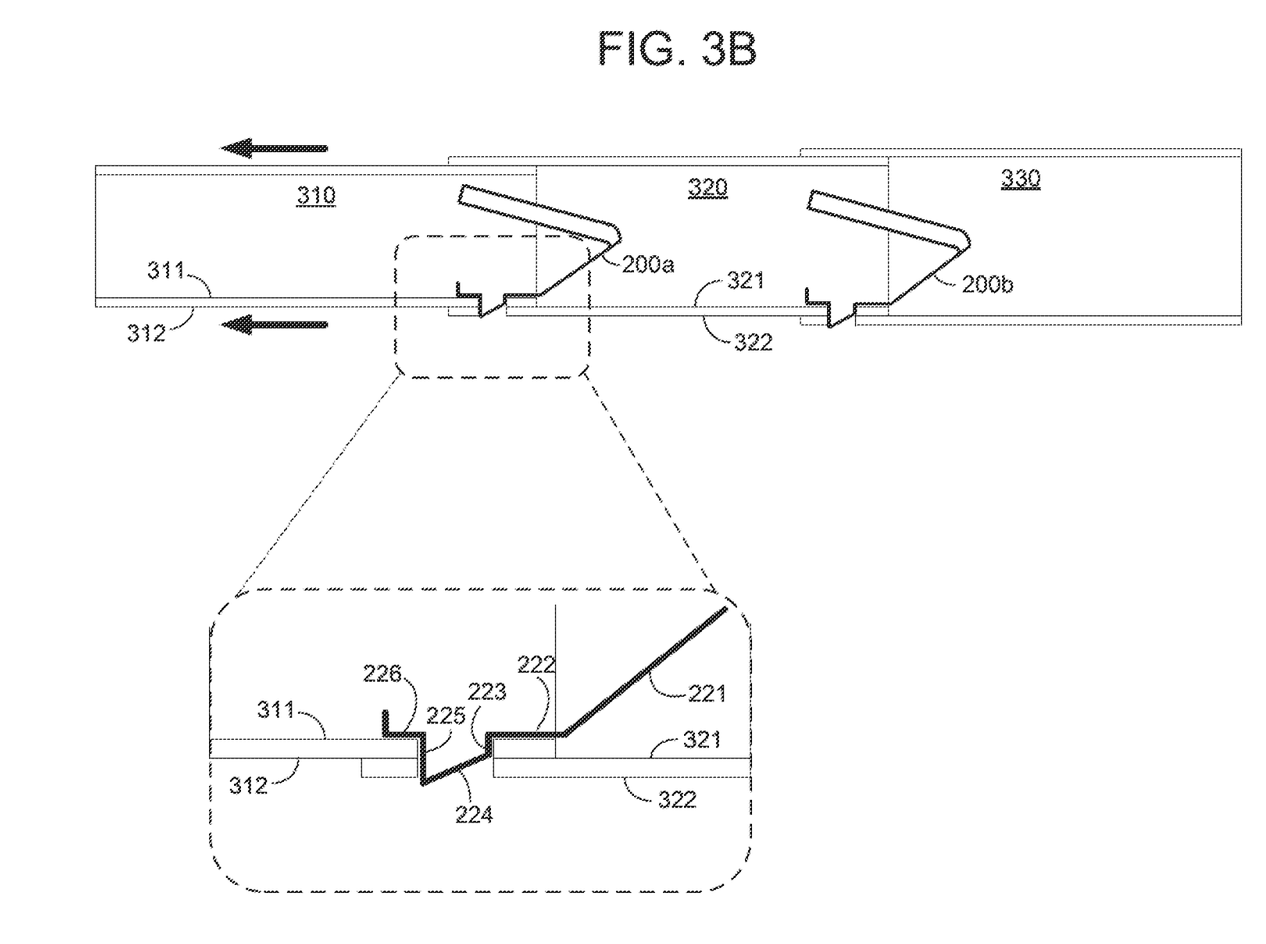
FIG. 3B is a diagram illustrating the leg retention clip of FIG. 3A in an uncompressed state in accordance with an example embodiment.

FIG. 3A illustrates a leg retention clip 200a in a compressed state and a leg retention clip 200b in an uncompressed state in accordance with an example embodiment, and FIG. 3B illustrates both leg retention clips 200a and 200b in an uncompressed state in accordance with an example embodiment. In FIG. 3B, the hollow tubular leg section 310 has been pulled outward (away from hollow tubular leg section 320) causing the protruding edge 224 of the leg retention clip 200a which is protruding from an opening of the hollow tubular leg section 310 to push through an opening of the hollow tubular leg section 320 thereby preventing the hollow tubular leg section 310 from being pulled any farther outward from the hollow tubular leg section 320.

Referring to FIGS. 3A and 3B, the hollow tubular leg sections 310, 320, and 330 may be interconnected with each other in a partially overlapping fashion. For example, hollow tubular leg section 320 may be slid into an opening of hollow tubular leg section 330 which has an interior diameter that is larger than an exterior diameter of the hollow tubular leg section 320. Likewise, hollow tubular leg section 310 may be slid into an opening on the other side of the hollow tubular leg section 320 because the interior diameter of the hollow tubular leg section 320 is larger than an outer diameter of the hollow tubular leg section 310. The hollow tubular leg section 320 includes an interior surface 321, an exterior surface 322, and an opening 323. Meanwhile, the tubular leg section 310 includes an interior surface 311, an exterior surface 312, and an opening which is housing the protruding edge 224 of the leg retention clip 200a.

Here, the leg retention clip 200a is in an unlocked state. Accordingly, the hollow tubular leg section 310 can be freely moved both into and out of (e.g., left and right in the figure) of the hollow tubular leg section 320. In particular, the protruding edge 224 of the leg retention clip 200*a* is prevented from decompressing outward by the contact from an interior surface 321 of the hollow tubular leg section 320. However, the protruding edge 224 is protruding enough to keep the leg retention clip 200 locked to the hollow tubular section 310 because the stop face 225 is in contact with a tube wall of the hollow tubular leg section 310 (i.e., the tube wall exposed by an opening in the hollow tubular leg section 310).

However, if a user were to pull/move the hollow tubular leg section 310 away from the hollow tubular leg section 320, the protruding edge 224 may eventually align with the opening 323. When this occurs, the protruding edge 224 will decompress outward through the opening 323 and the stop face 225 will contact a tube wall of the hollow tubular leg section 320. In this case, the protruding edge 224 moves in both the opening of the hollow tubular leg section 310 and the hollow tubular leg section 320 and extends outward from the opening 323 of the hollow tubular leg section 320 (i.e., outward from the exterior surface 322), as shown in FIG. 3B. Once inserted into the opening 323, the stop face 225 stops the hollow tubular leg section 320 from moving right and the stop face 223 stops the hollow tubular leg section 310 from moving left. Thus, the double stop faces 223 and 225 prevent the hollow tubular leg section 310 from being pulled outward anymore from the hollow tubular leg section 320. If desired, a leg lock can be applied over the area where the leg retention clip 200*a* is located to further lock the hollow tubular leg sections 310 and 320 together and prevent the hollow tubular leg section 310 from moving towards the hollow tubular leg section 320.

Figure 4:
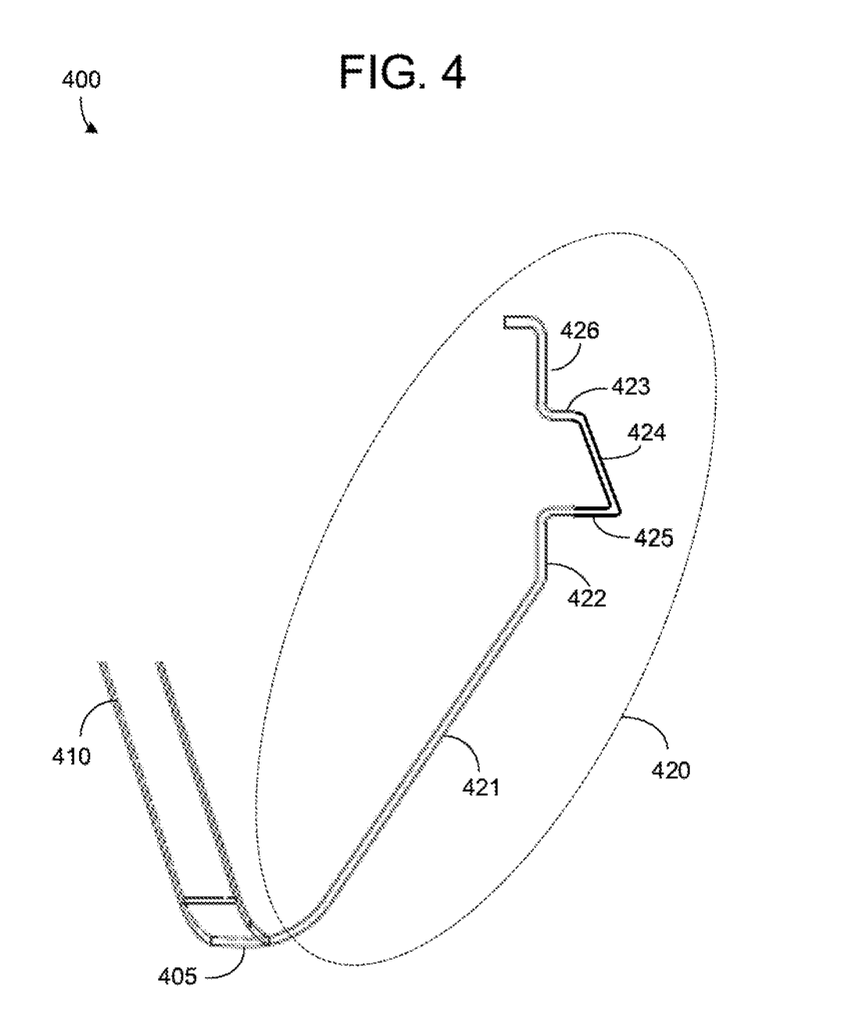
FIG. 4 is a diagram illustrating another example of a leg retention clip in accordance with an example embodiment.

FIG. 4 illustrates another example of a leg retention clip 400 in accordance with an example embodiment. As in the leg retention clip 200 of FIGS. 2A and 2B, the leg retention clip includes a prong 410 and a prong 420. Here, the prong 420 is shown in detailed view including a prong arm 421, a first contact face 422, a first stop face 425, a protruding edge 424, a second stop face 423, and a second contact face 426. In this example, the shape of a protruding edge 424 of the leg retention clip 400 is the same shape as the protruding edge 224 of the leg retention clip 200 shown in FIGS. 2A and 2B. However, in this example, a prong arm 421 extends downward instead of upward and the first stop face 425 and the second stop face 423 are in opposite positions as the first stop face 223 and the second stop face 225 in FIGS. 2A and 2B. Thus, a center arch 405 is below the protruding edge 424 of the leg retention clip 400 instead of above it. In this example, the protruding edge 424 protrudes from the opening of the tubular leg section in the same way, but the prong are 421 compresses on the underneath side instead of above.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A tripod apparatus, comprising:
   a leg that comprises a second hollow tube section that slides over a first hollow tube section, where the first hollow tube section comprises a first opening and the second hollow tube section comprises an internal recess; and
   a retention clip that fits inside the first hollow tube section and comprises a prong with a ramp-shaped protruding edge that protrudes outward through the first opening of the first hollow tube section and only partially into the internal recess of the second hollow tube section when the internal recess of the second hollow tube section is aligned with the first opening of the first hollow tube section,
   wherein a tube wall of the second hollow tube section is configured to slide over the first hollow tube section in a first direction and stop when the prong is aligned with the internal recess of the second hollow tube section, and freely slide back in a second direction due to the ramp-shaped protruding edge that only protrudes partially into the internal recess of the second hollow tube section.

2. The tripod apparatus of claim 1, wherein the prong further comprises a first stop face that is configured to prevent movement of the retention clip within the first hollow tube section and a second stop face is configured to prevent movement of the second hollow tube section with respect to the first hollow tube section.

3. The tripod apparatus of claim 2, wherein the first stop face and the second stop face each comprise flat surfaces that run parallel to one another.

4. The tripod apparatus of claim 1, wherein the retention clip comprises a plurality of prongs that are interconnected to each other at a central arch.

5. The tripod apparatus of claim 4, wherein the plurality of prongs are configured to compress when an interior of the second hollow tube section contacts protruding edges of the plurality of prongs, respectively.

6. The tripod apparatus of claim 5, wherein the plurality of prongs are configured to decompress when a plurality of internal recesses of the second hollow tube section are positioned over the plurality of protruding edges of the plurality of prongs, respectively.

7. The tripod apparatus of claim 1, wherein the retention clip comprises three or more prongs.

8. The tripod apparatus of claim 1, wherein each prong further includes a first contacting face and a second contacting face which contact an interior wall of the first hollow tube section.

9. The tripod apparatus of claim 8, wherein the ramp-shaped protruding edge is between the first contacting face and the second contacting face.

10. A leg retention clip comprising:
    one or more prongs,
    wherein each prong is configured to fit through a first opening of a first hollow tube section and an internal recess of a second hollow tube section, when the second hollow tube section is slid over the first hollow tube section,
    wherein each prong includes a leg retention clip that fits inside the first hollow tube section and comprises a ramp-shaped protruding edge that protrudes outward through the first opening of the first hollow tube section and only partially into the internal recess of the second hollow tube section when the internal recess of the second hollow tube section is aligned with the first opening of the first hollow tube section,
    wherein a tube wall of the of the second hollow tube section is configured to slide over the first hollow tube section in a first direction and stop when the prong is aligned with the internal recess of the second hollow tube section, and freely slide back in a second direction due to the ramp-shaped protruding edge that only protrudes partially through the internal recess of the second hollow tube section.

11. The leg retention clip of claim 10, wherein the prong further comprises a first stop face that is configured to prevent movement of the leg retention clip within the first hollow tube section and a second stop face is configured to prevent movement of the second hollow tube section with respect to the first hollow tube section.

12. The leg retention clip of claim 11, wherein the first stop face and the second stop face each comprise flat surfaces that run parallel to one another.

13. The leg retention clip of claim 10, wherein the leg retention clip comprises a plurality of prongs that are interconnected to each other at a central arch.

14. The leg retention clip of claim 13, wherein the plurality of prongs are configured to compress when an interior of the second hollow tube section contacts protruding edges of the plurality of prongs, respectively.

15. The leg retention clip of claim 14, wherein the plurality of prongs are configured to decompress when a plurality of internal recesses of the second hollow tube section are positioned over the plurality of protruding edges of the plurality of prongs, respectively.

16. The leg retention clip of claim 10, wherein the leg retention clip comprises three or more prongs.

17. The leg retention clip of claim 10, wherein each prong further includes a first contacting face and a second contacting face which contact an interior wall of the first hollow tube section.

18. The leg retention clip of claim 17, wherein ramp-shaped protruding edge is between the first contacting face and the second contacting face.

\* \* \* \* \*